US008898592B2

(12) United States Patent
Loughlin et al.

(10) Patent No.: US 8,898,592 B2
(45) Date of Patent: Nov. 25, 2014

(54) GROUPING EXPANDED AND COLLAPSED ROWS IN A TREE STRUCTURE

(75) Inventors: Cheryl D. Loughlin, Poughkeepsie, NY (US); Gayle C. Steinbugler, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 13/173,454

(22) Filed: Jun. 30, 2011

(65) Prior Publication Data

US 2013/0007658 A1 Jan. 3, 2013

(51) Int. Cl.
*G06F 3/048* (2013.01)
*G06F 17/20* (2006.01)
*G06F 3/0483* (2013.01)

(52) U.S. Cl.
CPC .................................. *G06F 3/0483* (2013.01)
USPC ........... 715/810; 715/200; 715/234; 715/775; 715/853

(58) Field of Classification Search
USPC .......... 715/853–855, 200, 227, 234, 775, 810
See application file for complete search history.

(56) References Cited

U.S. PATENT DOCUMENTS

| | | | |
|---|---|---|---|
| 7,895,216 B2 * | 2/2011 | Longshaw et al. ............ | 707/752 |
| 8,037,035 B2 * | 10/2011 | Kataoka et al. ............... | 707/693 |
| 2004/0243616 A1 * | 12/2004 | Benhase et al. ............... | 707/102 |
| 2005/0076312 A1 * | 4/2005 | Gardner et al. ............... | 715/853 |
| 2006/0041502 A1 * | 2/2006 | Blair et al. ...................... | 705/37 |
| 2006/0248455 A1 * | 11/2006 | Weise et al. .................... | 715/526 |
| 2010/0083173 A1 * | 4/2010 | Germann et al. ............. | 715/810 |
| 2010/0122211 A1 * | 5/2010 | Abernethy et al. ........... | 715/810 |
| 2010/0125779 A1 | 5/2010 | Choudhury | |
| 2010/0241657 A1 * | 9/2010 | Parks et al. ................... | 707/769 |

FOREIGN PATENT DOCUMENTS

CN 1341895 A 3/2002

OTHER PUBLICATIONS

TeamDev Ltd, 2009, TreeTable-QuipuKit documentation, online publication. http://www.teamdev.com/downloads/quipukit/documentation/developersGuide/treetable.html.*
TeamDev Ltd., TreeTable, 2009, online publishing http://www.teamdev.com/downloads/quipukit/documentation/developersGuide/treetable.html.*
Scientific Application, [online]; [retrieved on Feb. 13, 2012]; retrieved from the Internet http://www.scientific.gr/javadoc/com/sciapp/tree/TreeTable.html.
Oracle, [online[; [retrieved on Feb. 13, 2012]; retrieved from the Internet http://docs.oracle.com/cd/E12839_01/web.1111/b31973/af_table.htm "10 Using Taqbles and Trees".

* cited by examiner

*Primary Examiner* — Nicholas Ulrich
*Assistant Examiner* — Shangao Zhang
(74) *Attorney, Agent, or Firm* — Cantor Colburn LLP; William A. Kinnaman, Jr.

(57) ABSTRACT

A method for viewing a tree structure can include retrieving, by a computer, the tree structure having a plurality of nodes for viewing on a display, receiving, by the computer, a user selection of a first node for expansion, receiving, by the computer, a user selection of a second node for expansion and grouping the first node and the second node.

13 Claims, 14 Drawing Sheets

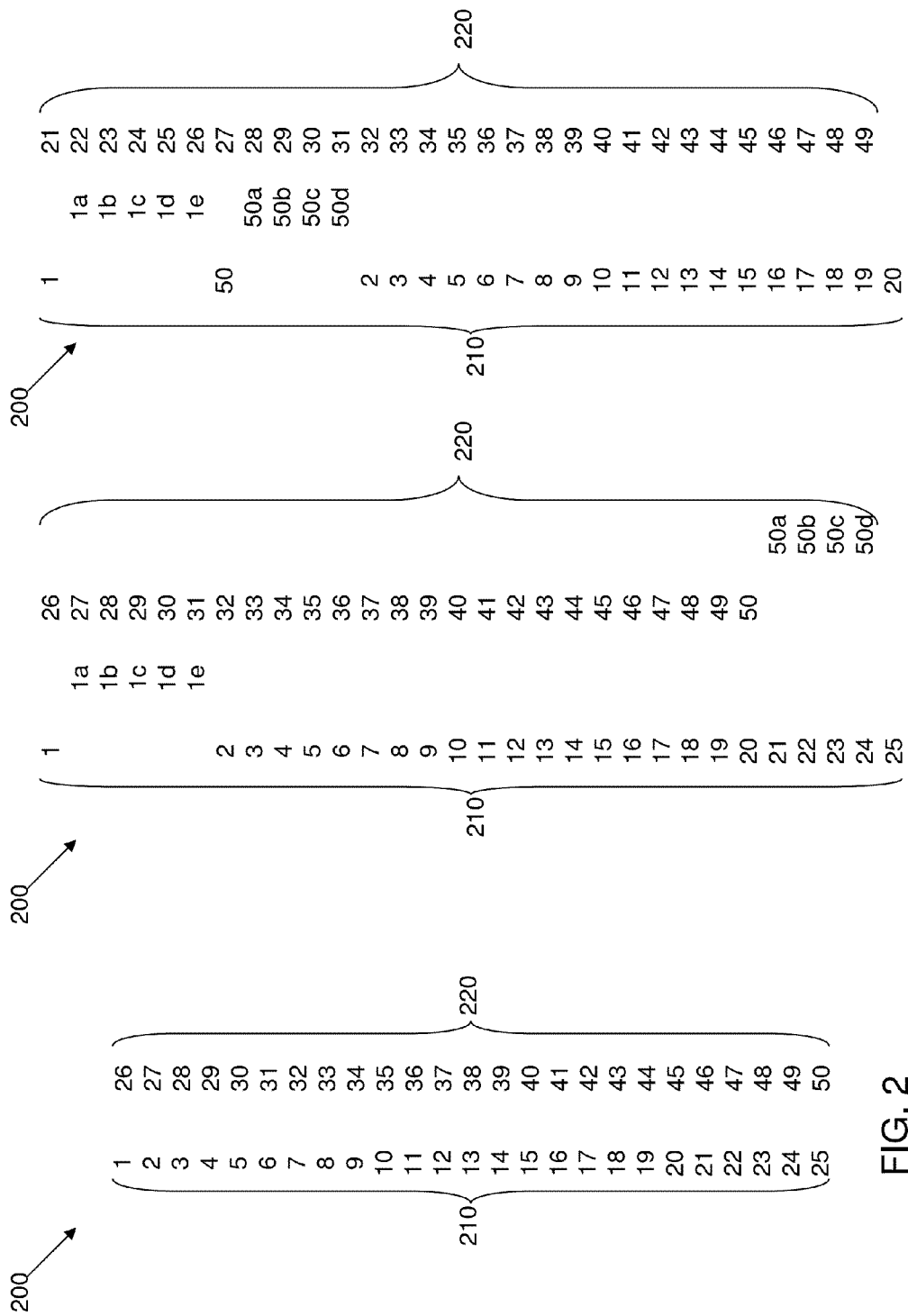

GROUPING EXPANDED AND COLLAPSED ROWS IN A TREE STRUCTURE

BACKGROUND

The present invention relates to tree tables, and more specifically, to systems and methods for displaying and grouping expanded and collapsed rows in a structure such as a tree table.

Trees are presentation structures that enable display of nodes, such as data or files, in a parent child format that can be expanded and collapsed. Trees can be helpful for organizing or classifying nodes because every node can be traced to a single origin through a unique path. In tree tables with large numbers of parent and child nodes, often a user may expand multiple nodes that are out of respective viewing range. As such, scrolling may be required to view items in more than one expanded node. Current methods implement a filter and/or sorting function, for example, to view expanded nodes in the same display view. However, filtering and sorting requires numerous steps and can eliminate the possibility of selecting some nodes because they are no longer in the filtered view.

SUMMARY

Exemplary embodiments include a method for viewing a tree structure, the method including retrieving, by a computer, the tree structure having a plurality of nodes for viewing on a display, receiving, by the computer, a user selection of a first node for expansion, receiving, by the computer, a user selection of a second node for expansion and grouping the first node and the second node.

Additional exemplary embodiments include a computer program product having a non-transitory computer readable medium having instructions to cause a computer to perform a method for viewing a tree structure. The method can include retrieving the tree structure having a plurality of nodes for viewing on a display, receiving a user selection of a first node for expansion, receiving a user selection of a second node for expansion and grouping the first node and the second node.

Additional exemplary embodiments can include a computer system, including a graphical user interface including a display and a selection device, and a computer configured to enable providing and selecting from a menu on the display. The computer can be configured to retrieve a tree structure having a plurality of nodes, retrieve a set of menu entries for the menu, each of the menu entries representing a tree structure characteristic, display the set of menu entries on the display, receive a first menu entry selection signal indicative of the selection device pointing at a first selected menu entry from the set of menu entries, in response to the first signal, display a first node on the display, receive a second menu entry selection signal indicative of the selection device pointing at a second selected menu entry from the set of menu entries, in response to the second signal, display a second node on the display, receive a third menu entry selection signal indicative of the selection device pointing at a third selected menu entry from the set of menu entries and in response to the third signal, group the first node and the second node.

Further exemplary embodiments include a computer program product having a non-transitory computer readable medium having instructions to cause a computer having a graphical user interface including a display and a selection device, to perform a method of providing and selecting from a menu on the display. The method can include retrieving a tree structure having a plurality of nodes, retrieving a set of menu entries for the menu, each of the menu entries representing a tree structure characteristic, displaying the set of menu entries on the display, receiving a first menu entry selection signal indicative of the selection device pointing at a first selected menu entry from the set of menu entries, in response to the first signal, displaying a first node on the display, receiving a second menu entry selection signal indicative of the selection device pointing at a second selected menu entry from the set of menu entries, in response to the second signal, displaying a second node on the display, receiving a third menu entry selection signal indicative of the selection device pointing at a third selected menu entry from the set of menu entries and in response to the third signal, grouping the first node and the second node.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 illustrates an example of a tree structure;

FIG. 3 illustrates the tree structure of FIG. 2 with nodes expanded to child nodes;

FIG. 4 illustrates the example of the tree structure of FIG. 3, with expanded nodes grouped in accordance with exemplary embodiments;

FIGS. 8-10 illustrate additional example screenshots displaying a user interface having a tree table showing two expanded nodes and grouping in accordance with exemplary embodiments;

DETAILED DESCRIPTION

In exemplary embodiments, the systems and methods described herein sort trees according to expanded versus collapsed entries. In tree tables with large numbers of parent and child nodes, expanded nodes can be viewed in the same display view without collapsed nodes in between the expanded nodes. As such, scrolling is not necessary to view items in more than one expanded node. Once grouped, the expanded nodes could be placed at the top or bottom of a list in a tree table, for example.

Figure 1:
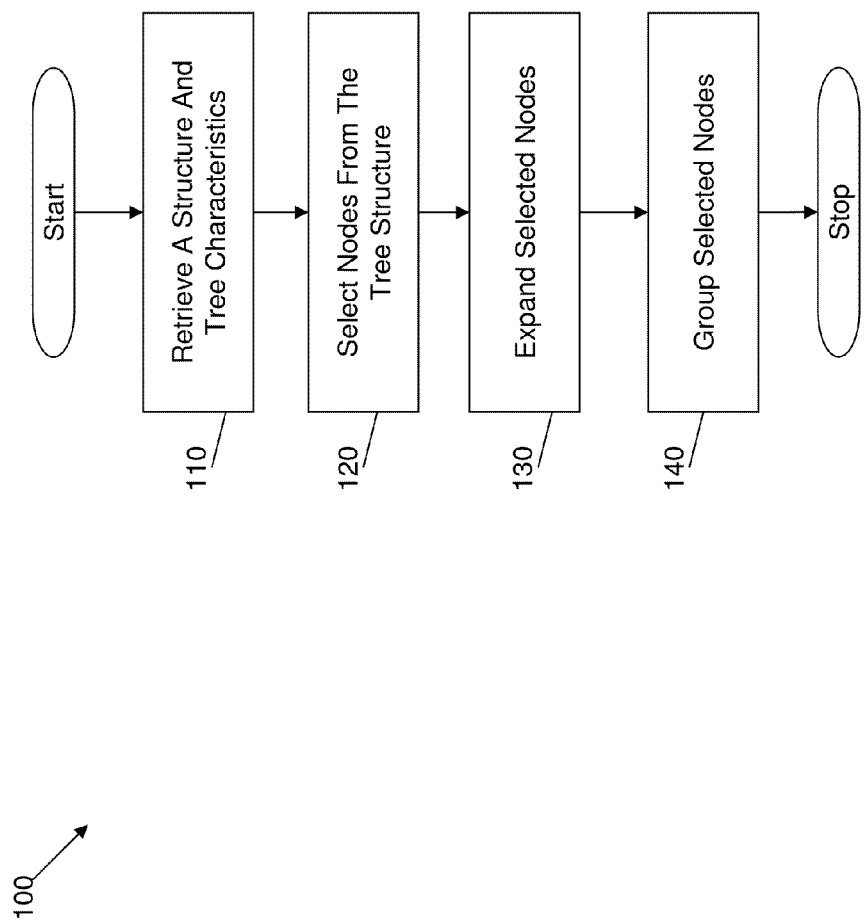
FIG. 1 illustrates a flow chart of a method for grouping expanded and collapsed rows in a tree structure in accordance with exemplary embodiments.

FIG. 1 illustrates a flow chart of a method 100 for grouping expanded and collapsed rows in a tree structure in accordance with exemplary embodiments. The method 100 can be implemented in any suitable computing system as further described herein. At block 110, the computing system retrieves a tree structure and associated characteristics from a memory. The tree structure can represent any data structure stored in the memory, such as a file system. As such, the tree structure can be a tree table. It can be appreciated that the tree structure includes several nodes that represent data, such as individual files. Each node can further be expanded to other nodes. As such, the tree structure includes several parent and child nodes. It will be appreciated that the exemplary systems and methods described herein can group any expanded and collapsed tree structures that can be displayed on a computing system display and user interface. The tree characteristics can be any characteristic associated with the tree such as display characteristics (e.g., font, color and the like), and node location (e.g., toward the top or bottom of the computing system display). FIG. 2 illustrates an example of a tree structure 200 that can be received at block 110. For illustrative purposes, the tree structure 200 is shown having simple numerical nodes. In addition, a first group of nodes 210 is viewable on a computing system display while a second group of nodes 220 is not viewable on the computing system display while the first group of nodes 210 is viewable. Currently, user needs to scroll down the computing system display in order to view the second group of nodes 220.

Referring again to FIG. 1, at block 120, a user may decide to view a certain number of nodes in the tree structure. For illustrative purposes, the user selects node 1 and node 50. Furthermore, at block 130, the user expands the selected nodes 1, 50 for viewing child nodes. FIG. 3 illustrates the tree structure 200 of FIG. 2 with nodes 1, 50 expanded to child nodes 1a, 1b, 1c, 1d, 1e, and 50a, 50b, 50c, 50d, respectively. As described herein, the first group of nodes 210 is viewable on the computing system display, while the second group of nodes 220 is not viewable without scrolling. Currently, even with scrolling, the user cannot view the expanded nodes 1a, 1b, 1c, 1d, 1e, simultaneously with expanded nodes 50a, 50b, 50c, 50d. In exemplary embodiments, at block 140, the user can group the expanded nodes 1a, 1b, 1c, 1d, 1e and 50a, 50b, 50c, 50d. FIG. 4 illustrates the example of the tree structure of FIG. 3, with the expanded nodes 1a, 1b, 1c, 1d, 1e and 50a, 50b, 50c, 50d grouped in accordance with exemplary embodiments. In exemplary embodiments, the expanded parent node 1 and the expanded parent node 50 can both be viewed on the computing system display simultaneously without the need to scroll. The remaining collapsed parent nodes are still available for viewing and expanding in case the user wants to further view any collapsed parent nodes.

Current sorting behavior only allows the user to sort on actual text content in a cell (ascending descending, i.e., 1-50 or 50-1). This sorting also sorts the children in the corresponding order while maintaining the subordinate relationship with the associated parent. There is no current sort that allows placing #1 with #50 while leaving 2-49 sorted numerically. Current filtering behavior might, with several clicks, allow a user to display just the nodes that the user wants to compare, but would also remove all other nodes so that there would be no way to easily expand another node for additional comparison. Additionally, using filtering would generally remove some, if not all, of the child objects from the expanded nodes as they might not meet the filter criteria. Current filtering in this manner thus additionally hinders the ability to compare and accurately manage the data.

As such, the method 100 prevents the need for scrolling. Even with a small tree structure, with some at the top of the computing system display and some at the bottom of the computing system display, and all nodes viewable on the computing system display, grouping those scattered nodes on a page for comparison purposes can be beneficial. The method 100 further allows sorting on a different attribute or characteristic of the tree structure 200 rather than just on an attribute of data. In addition, the method 100 allows grouping collapsed nodes together to aid a user in noticing a node that the user might want to expand. The user can compare more data together without having to use a filter, which could narrow the nodes too much. As such, the method 100 retains all data in view, and groups the data in which the user is actively interested. The user can therefore do more comparing, contrasting, copying and pasting without having to scroll, turn on and off filters and the like. If the user has acted on the wrong data or is comparing the wrong data or has expanded the wrong data, the user can easily pick different data. By grouping nodes, rather than filtering nodes, all nodes are available for the user to work with. No nodes that the user may want to later expand or collapse are hidden.

Many user interface operations are contemplated. For example, "Modify Group" type functions can be available on the user interface. As such, the systems and methods described herein provide a visual indication of the node grouping. In exemplary embodiments, the visual indication can be coupled with a method of grouping by providing icon buttons in a table toolbar already available on current user interfaces. For example, one button can indicate expanded nodes grouped at the top of the display and another button indicating collapsed nodes grouped at the top. In exemplary embodiments, each button is a toggle to group nodes in a certain way or to ungroup. The last button clicked takes control (i.e., if 'All expanded nodes are grouped at the top of the table' is selected and then 'Click to move all collapsed nodes to the top of the table' is clicked, the table will be sorted with the collapsed nodes grouped at the top. There is no need to ungroup in one direction before grouping in the opposite direction.) Several of the exemplary user interfaces are now described.

Figure 5:
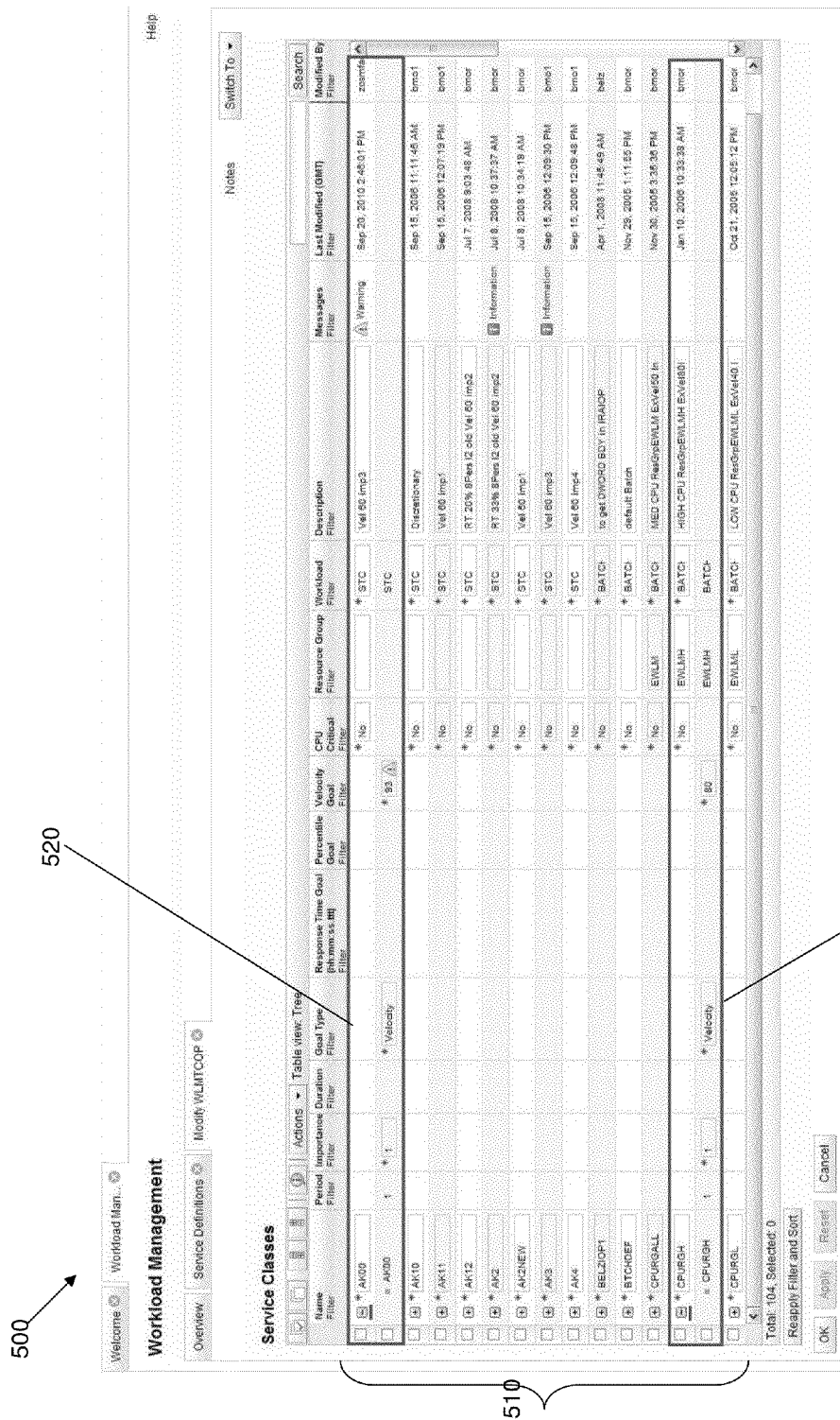
FIGS. 5-7 illustrate example screenshots displaying a user interface having a tree table showing two expanded nodes and grouping in accordance with exemplary embodiments.
Figure 6:
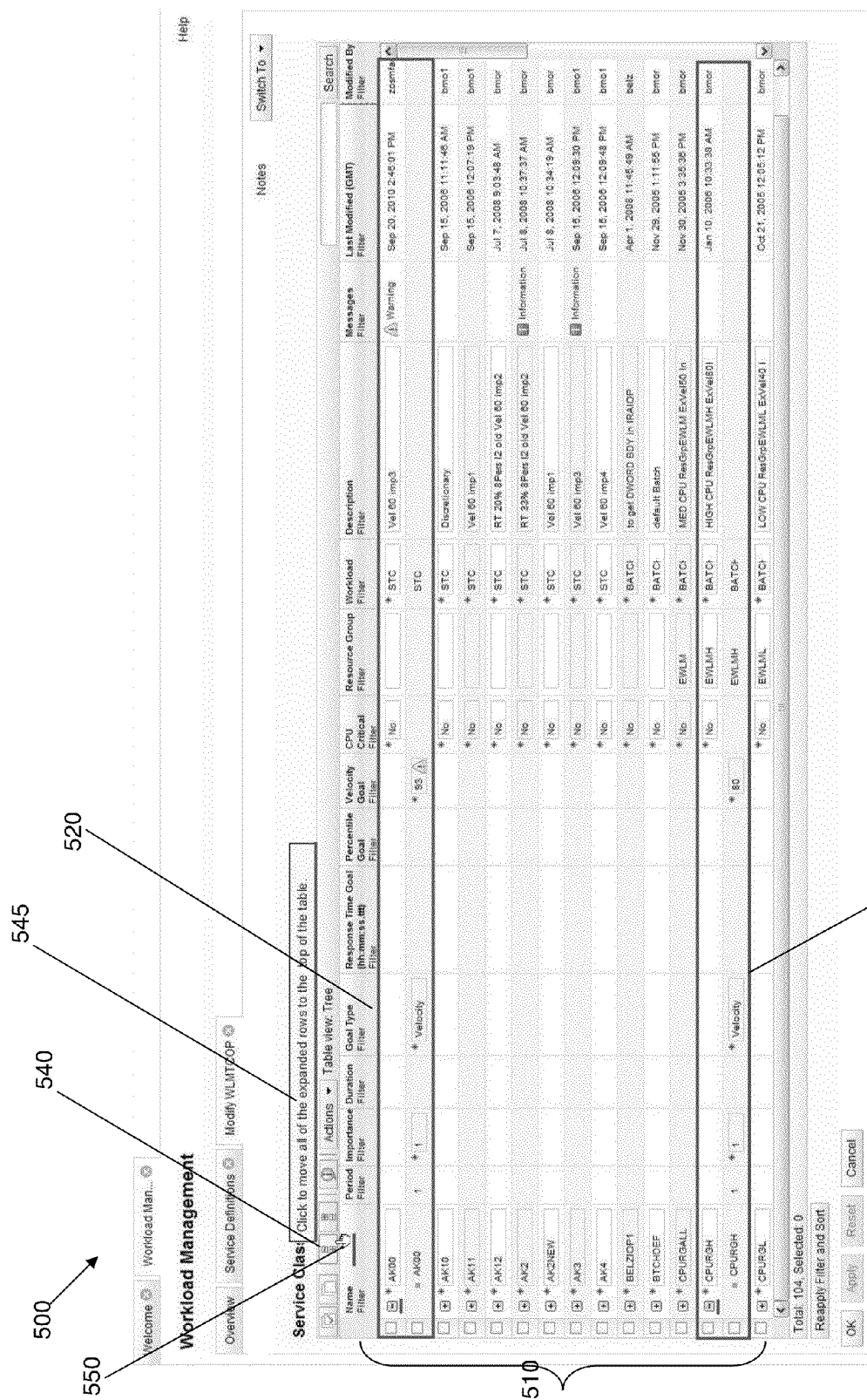
Figure 7:
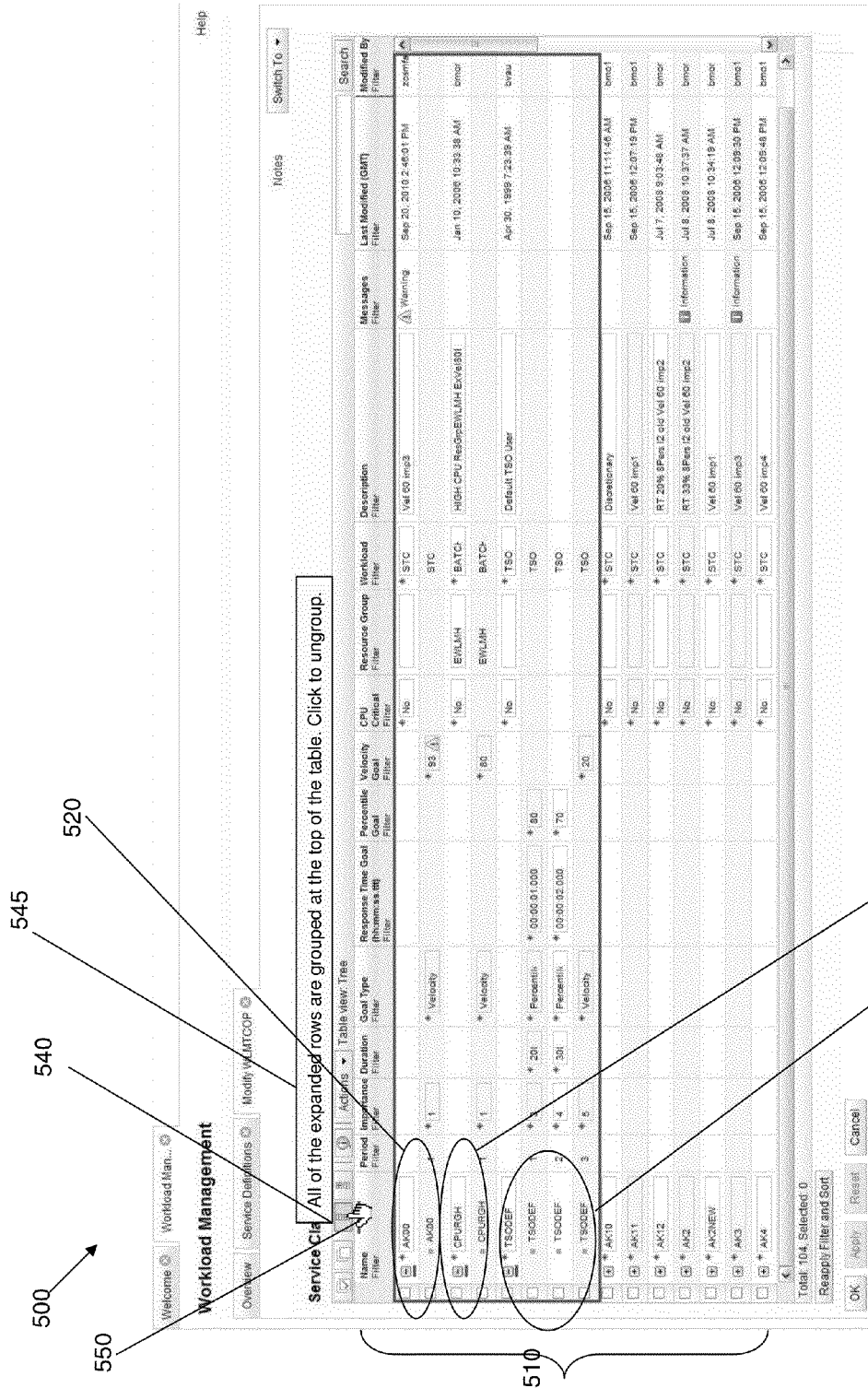

FIG. 5 illustrates an example of a screenshot 500 displaying a user interface having a tree table 510 showing two expanded nodes 520, 530. As further described herein, the example of FIG. 5 further includes an expanded node off-screen and not shown in FIG. 5. FIG. 6 illustrates the screenshot 500 of FIG. 5 further illustrating a button 540 that, when enabled, moves all expanded rows to a top location of the tree table 510 and in full view in accordance with exemplary embodiments. In addition, the button 540 can include functionality that when a mouse pointer 550 hovers over the button 540, hover highlight text 545 can be displayed indicating the associated function. In this case, the hover highlight text 545 indicates "Click to move all of the expanded rows to the top of the table." FIG. 7 illustrates the screenshot 500 of FIGS. 5 and 6, and further illustrating all expanded nodes have been grouped in accordance with exemplary embodiments. The expanded nodes include the expanded nodes 520, 530 and also an expanded node 560. The button 540 is depressed and the hover highlight text 545 now reads "All of the expanded rows are grouped at the top of the table. Click to ungroup." As such, further functionality, that is, ungrouping the grouped expanded nodes 520, 530, 560, is now available.

Figure 8:
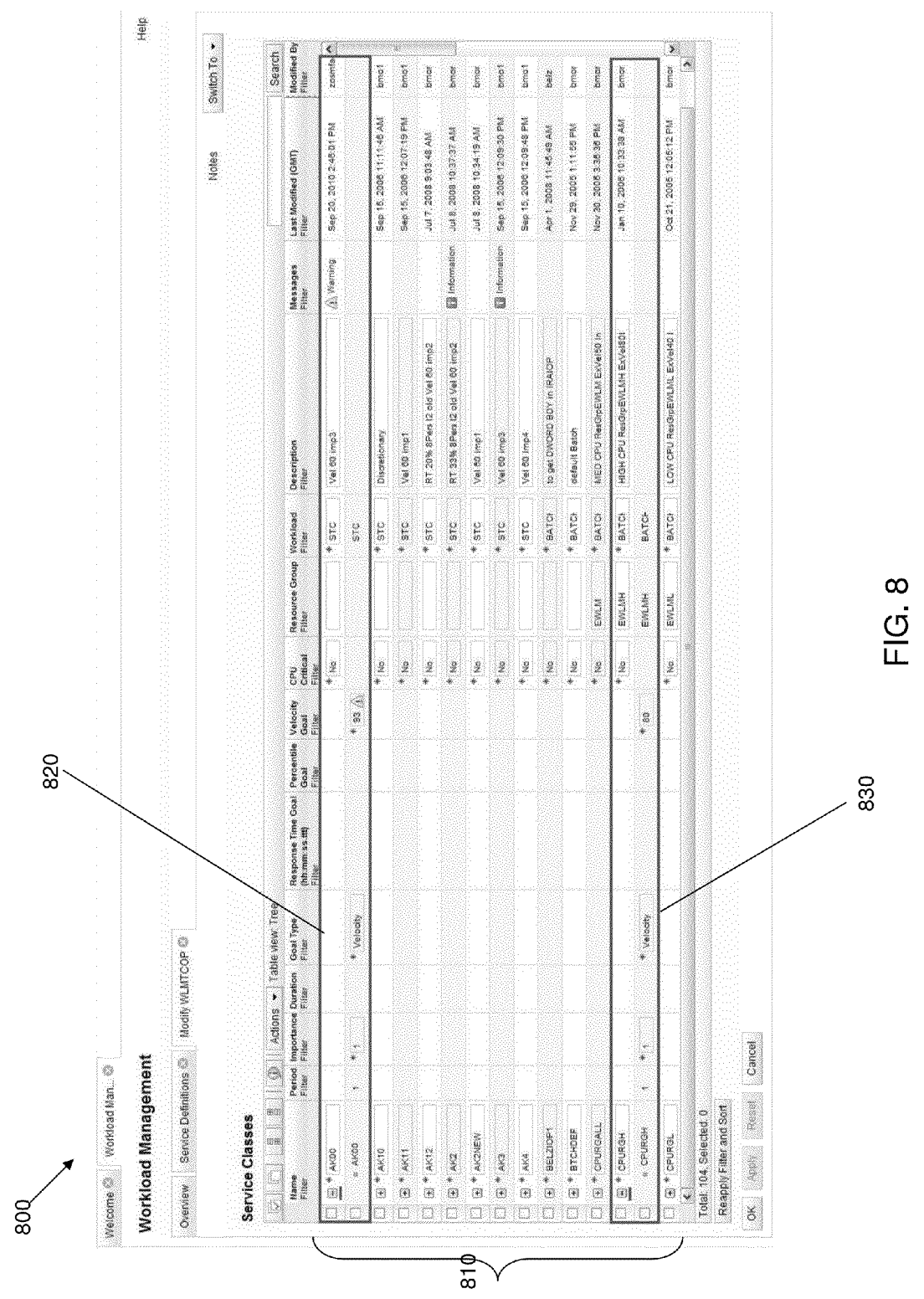
Figure 9:
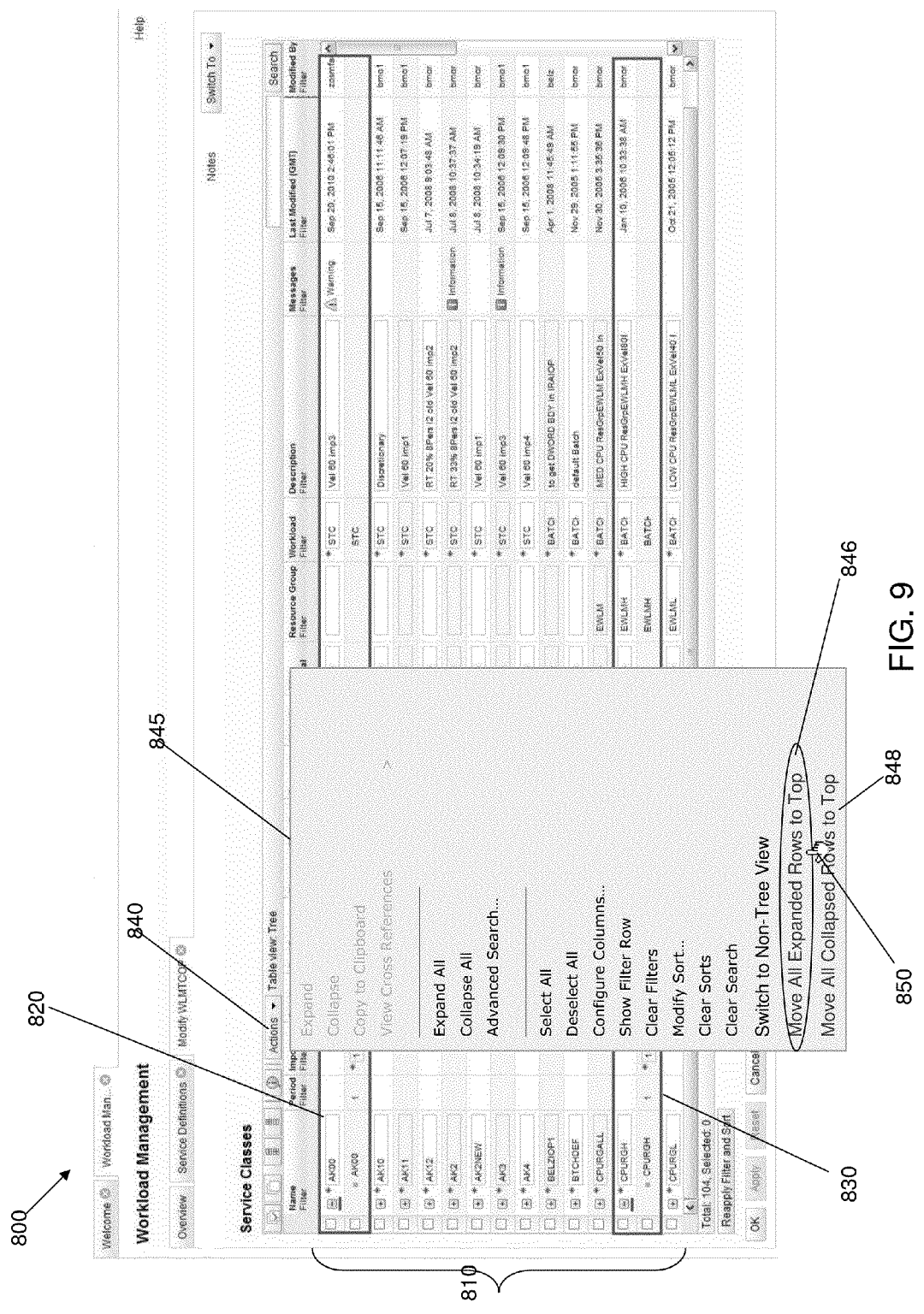
Figure 10:
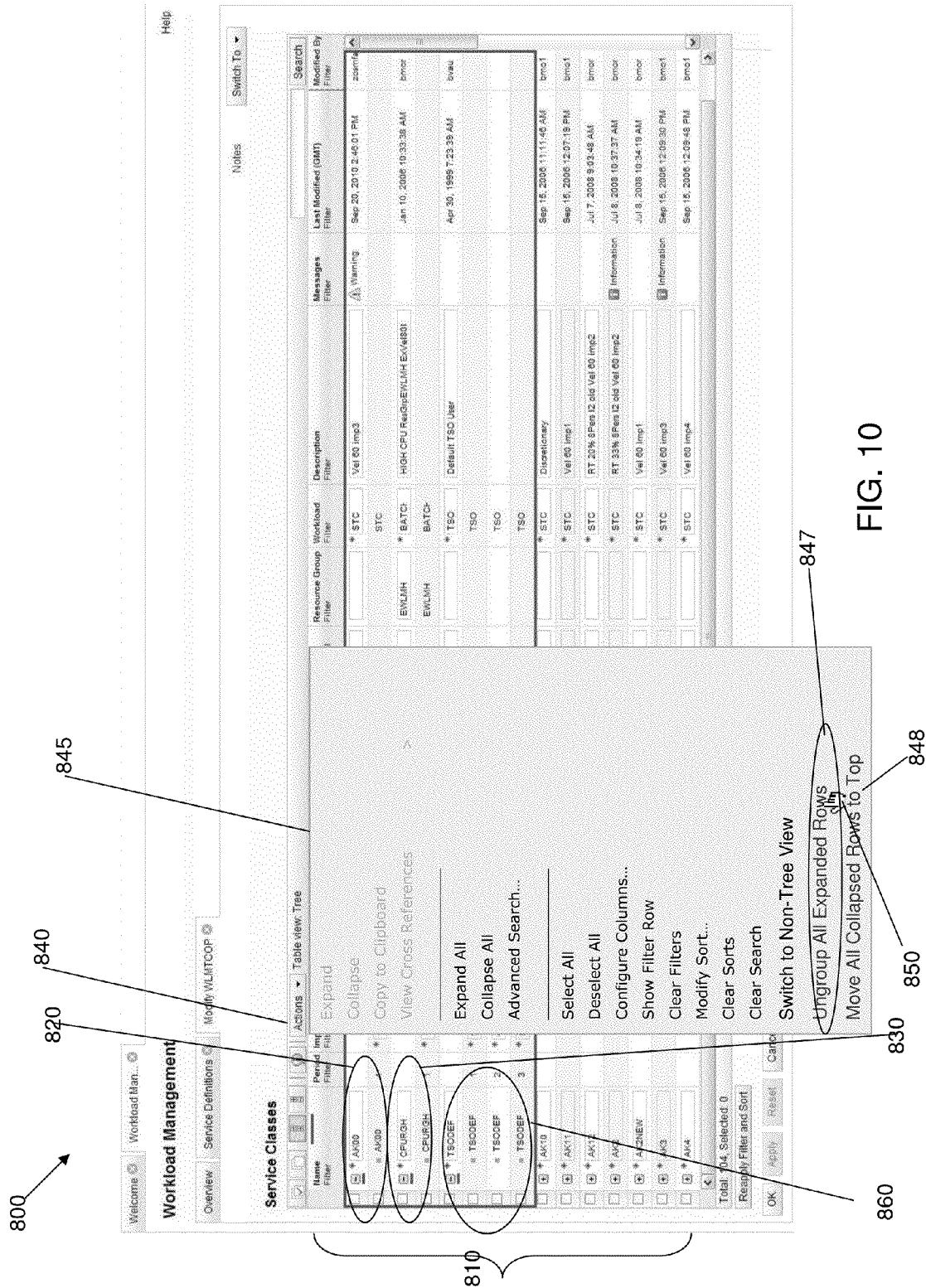

FIG. 8 illustrates an example of a screenshot 800 displaying a user interface having a tree table 810 showing two expanded nodes 820, 830. As further described herein, the example of FIG. 8 further includes an expanded node off-screen and not shown in FIG. 8. FIG. 9 illustrates the screenshot 800 of FIG. 8 further illustrating an actions button 840 that, when enabled, displays a menu 845 displaying an option 846 that, when selected by a mouse pointer 850, moves all expanded rows to a top location of the tree table 810 and in full view in accordance with exemplary embodiments. The menu 845 further includes an option to move all collapsed rows to the top in accordance with exemplary embodiments. FIG. 10 illustrates the screenshot 800 of FIGS. 8 and 9, and further illustrating all expanded nodes have been grouped in accordance with exemplary embodiments. The expanded nodes include the expanded nodes 820, 830 and also an expanded node 860. When the actions button 840 is enabled, a menu 845 displays an option 847 that, when selected by the mouse pointer 850, ungroups all the expanded nodes 820, 830, 860 in accordance with exemplary embodiments.

Figure 11:
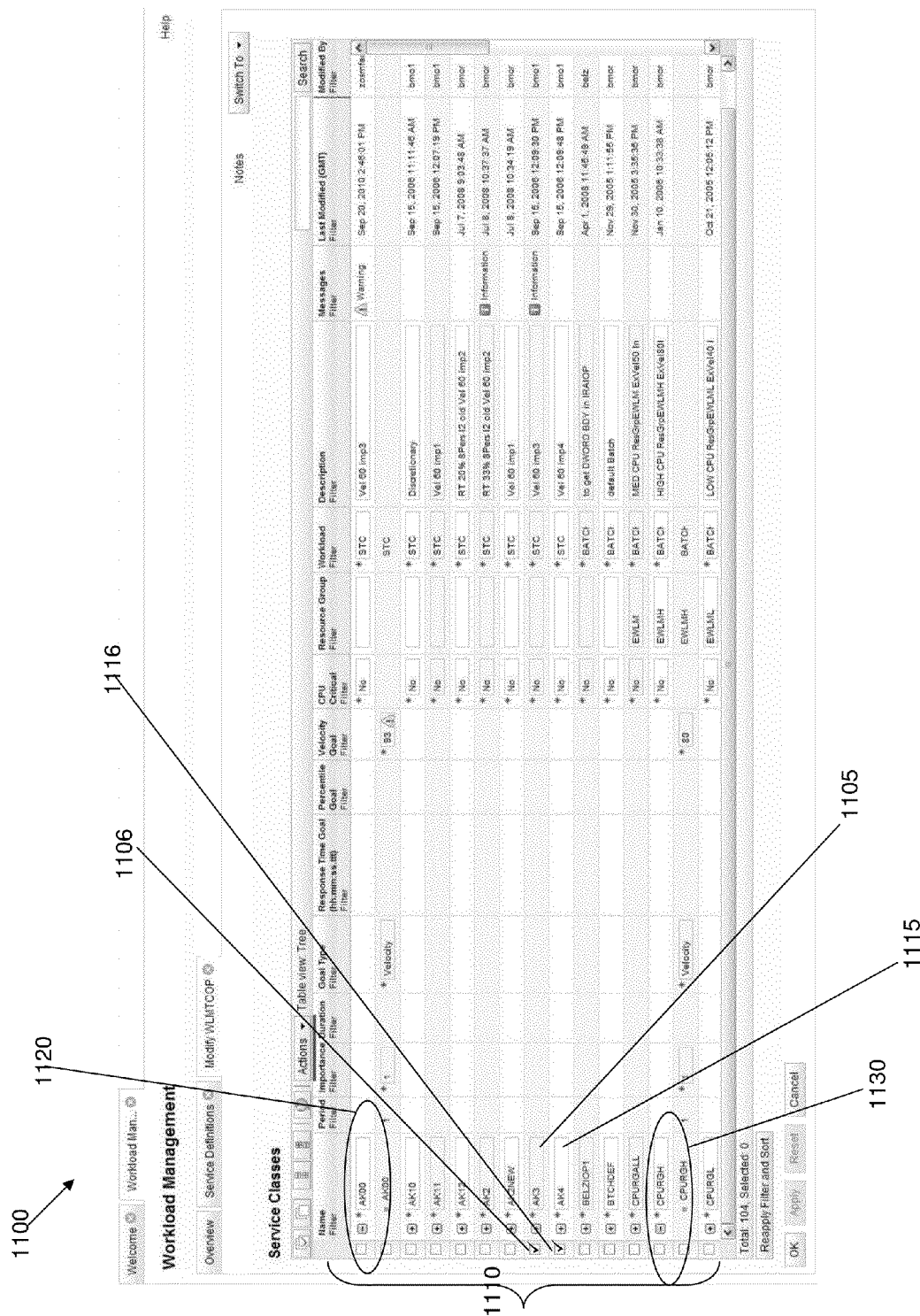
FIGS. 11-14 illustrate additional example screenshots displaying a user interface having a tree table showing two expanded nodes and grouping in accordance with exemplary embodiments.
Figure 12:
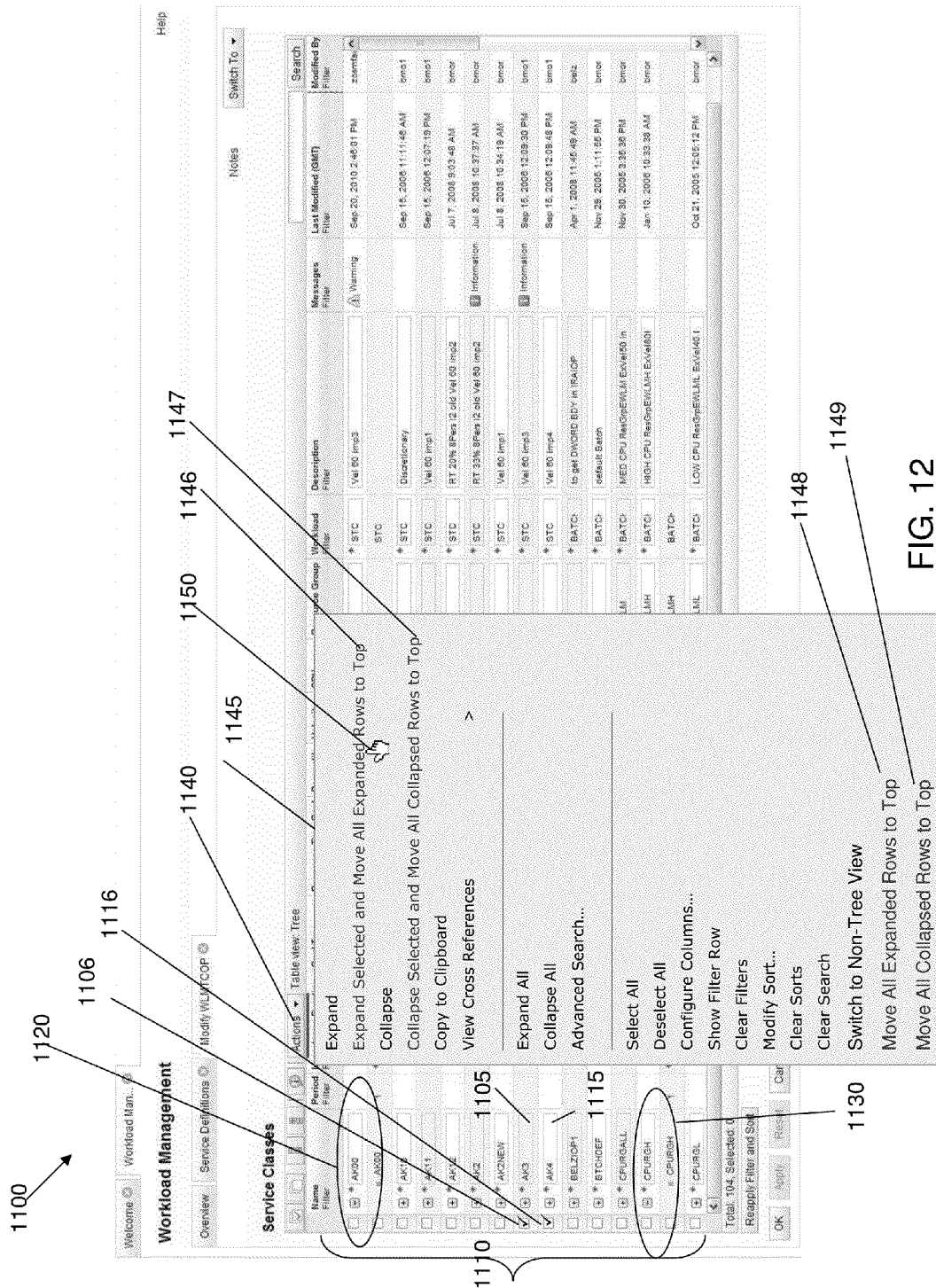
Figure 13:
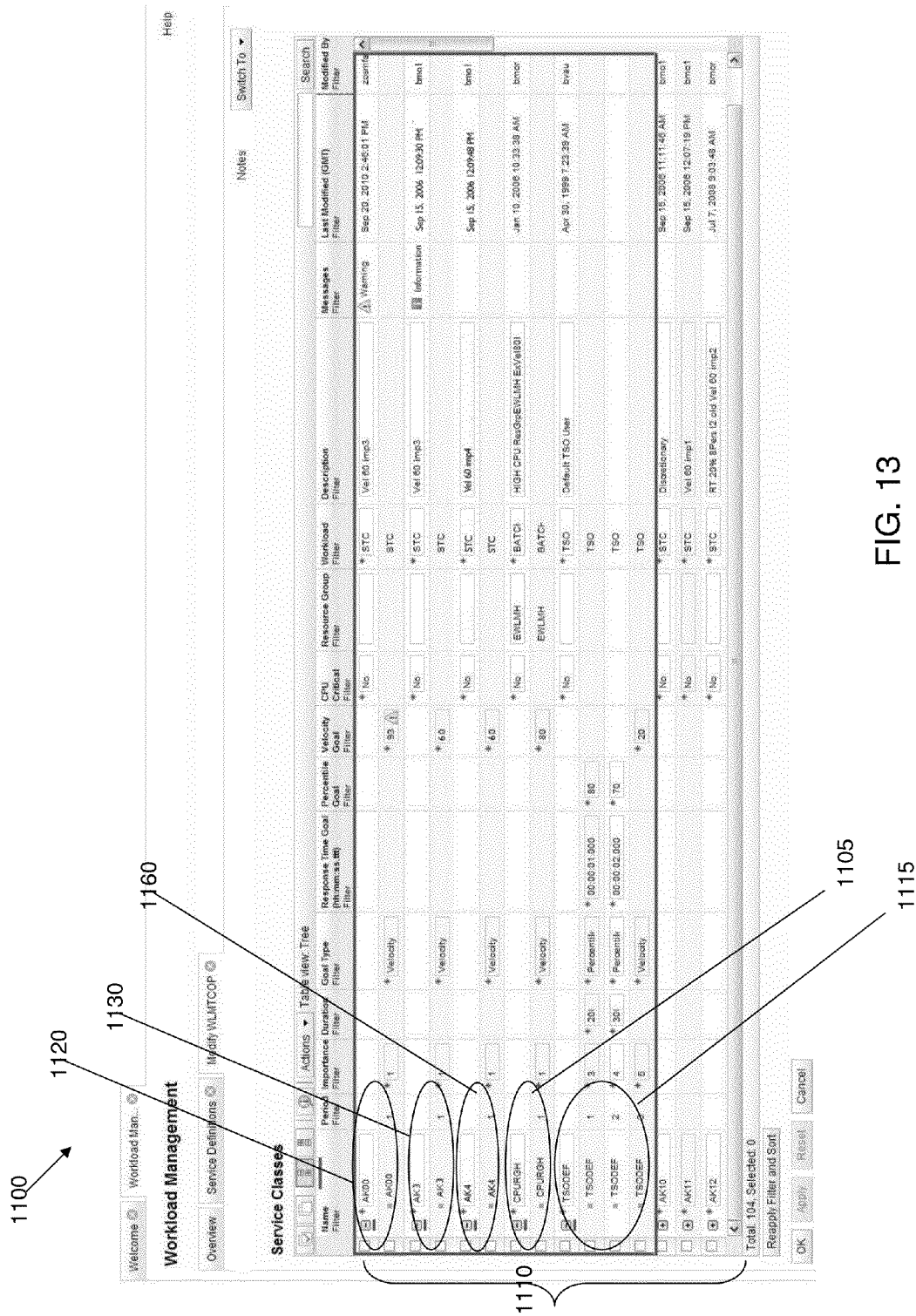
Figure 14:
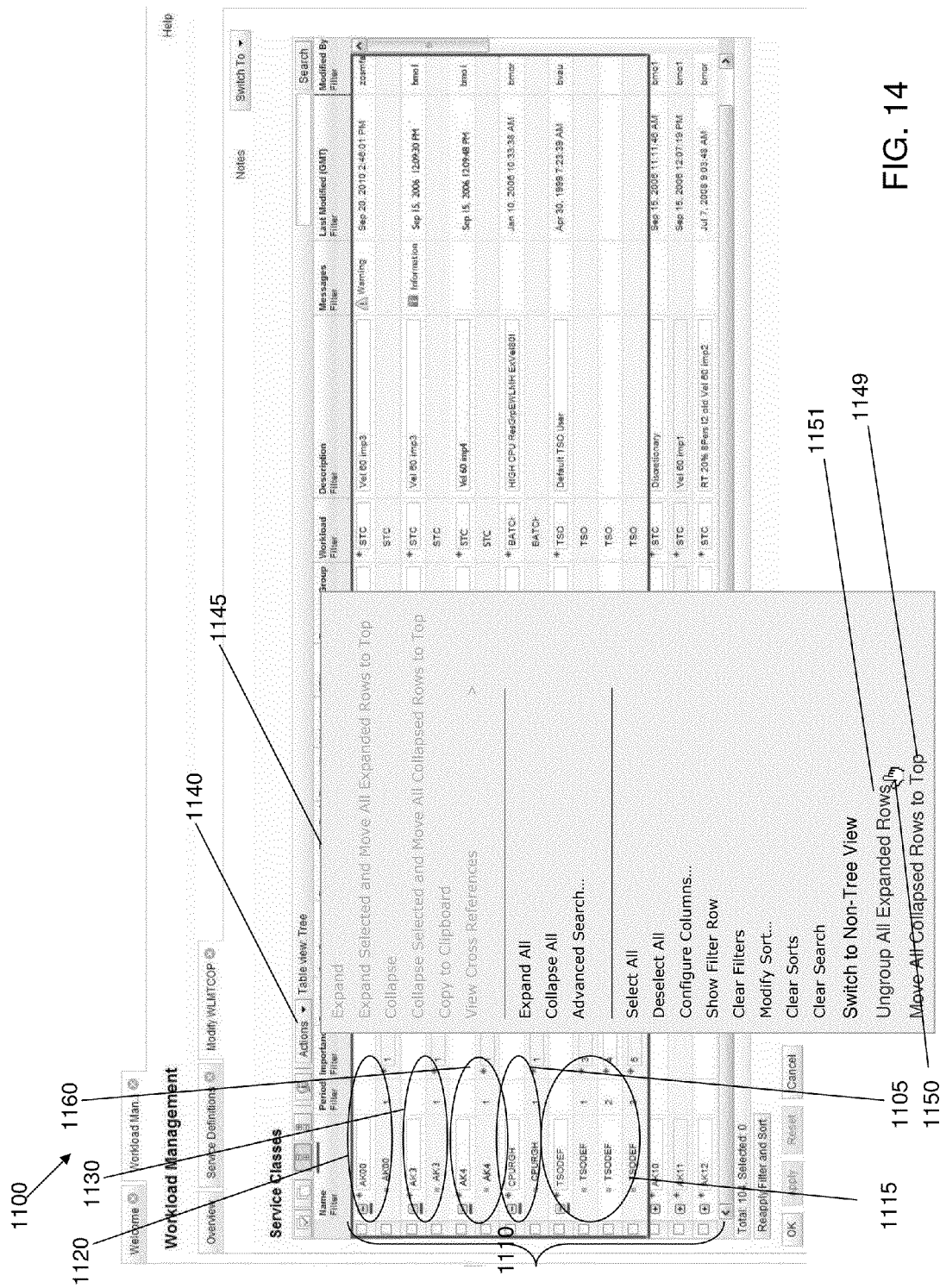

FIG. 11 illustrates an example of a screenshot 1100 displaying a user interface having a tree table 1110 showing two expanded nodes 1120, 1130. As further described herein, the example of FIG. 11 further includes an expanded node off-screen and not shown in FIG. 11. FIG. 11 further illustrates that two unexpanded nodes 1105, 1115 have been selected by respective check marks 1106, 1116. FIG. 12 illustrates the screenshot 1100 of FIG. 11 further illustrating an actions button 1140 that, when enabled, displays a menu 1145 displaying several options. A first option 1146, when selected by a mouse pointer 1150, not only expands the selected unexpanded rows 1105, 1115, but also moves all expanded rows to a top location of the tree table 1110 and in full view in accordance with exemplary embodiments. Another option 1147, not only collapses any selected rows, but also moves all collapsed rows to the top. Another option 1148 moves any already expanded rows to the top. Still another option 1149 move any already collapsed rows to the top. It can be appreciated that the menu options described herein provide several desirable functions depending on the state (i.e., expanded and/or collapsed) of the rows that the user desires to view and compare. FIG. 13 illustrates the screenshot 1100 of FIGS. 11 and 12, showing the expanded nodes 1120, 1130, the previously unviewable expanded node 1160, and the previously unexpanded but now expanded nodes 1105, 1115, all grouped at the top of the screen. FIG. 14 illustrates the screenshot 1100 of FIGS. 11, 12 and 13, illustrating all expanded nodes have been grouped in accordance with exemplary embodiments. FIG. 14 further illustrates that the button can be depressed to display the menu, which now further includes an option 1151 to ungroup all the expanded nodes in accordance with exemplary embodiments. It can be appreciated that the option 1151 can ungroup the nodes and place them back in the original placement in the tree table 1110, either in their original expanded or collapsed state, or all nodes in an expanded state.

Figure 15:
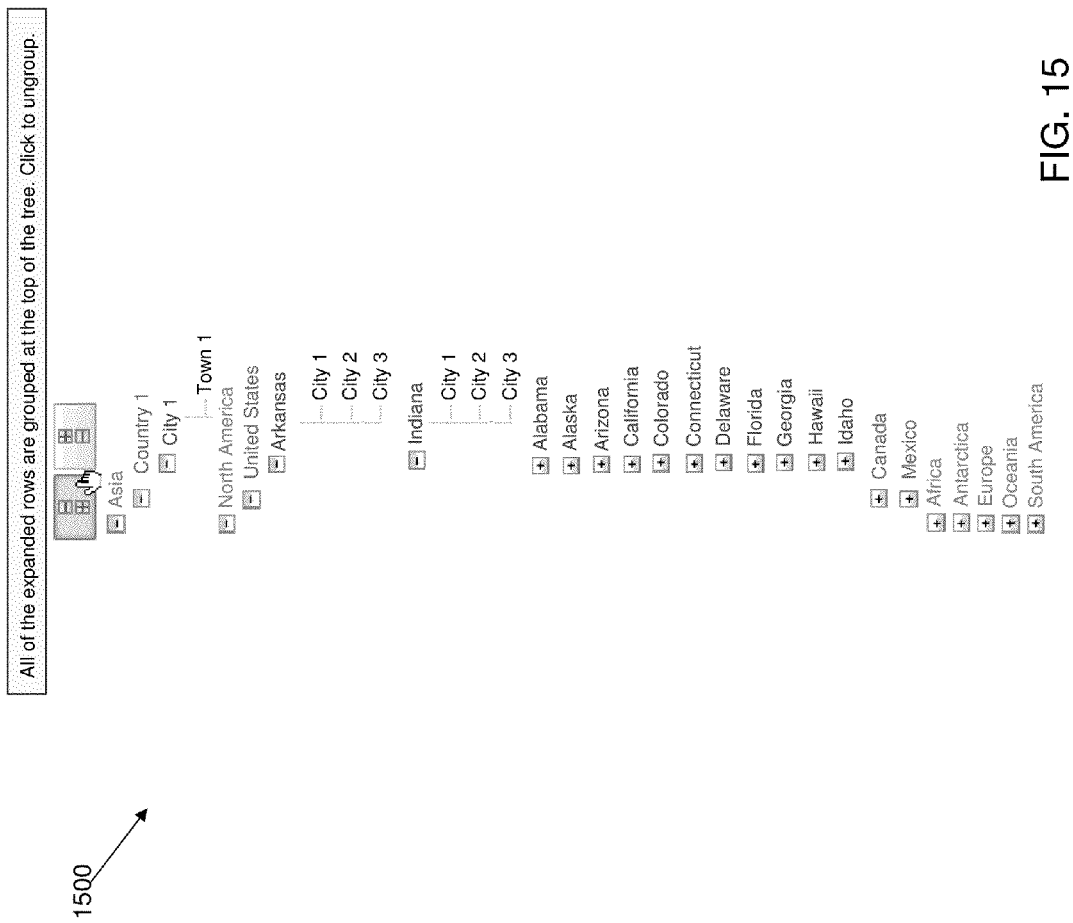
FIG. 15 illustrates an example of a tree structure with expanded nodes in multiple levels.

As described herein, the exemplary systems and methods can be implemented to group expanded or collapsed nodes/rows in any tree structure, and can group expanded nodes at multiple levels. FIG. 15 illustrates a generalized example of a tree structure 1500 illustrating expanded nodes that have been grouped. The expanded nodes illustrate three levels of expansion, in this case, continent, country, city/state, and city/town.

The examples illustrated herein have shown grouping the expanded/collapsed nodes/rows to the top of the display. It can be appreciated that the exemplary systems and methods described herein can also group at the bottom of the display.

Figure 16:
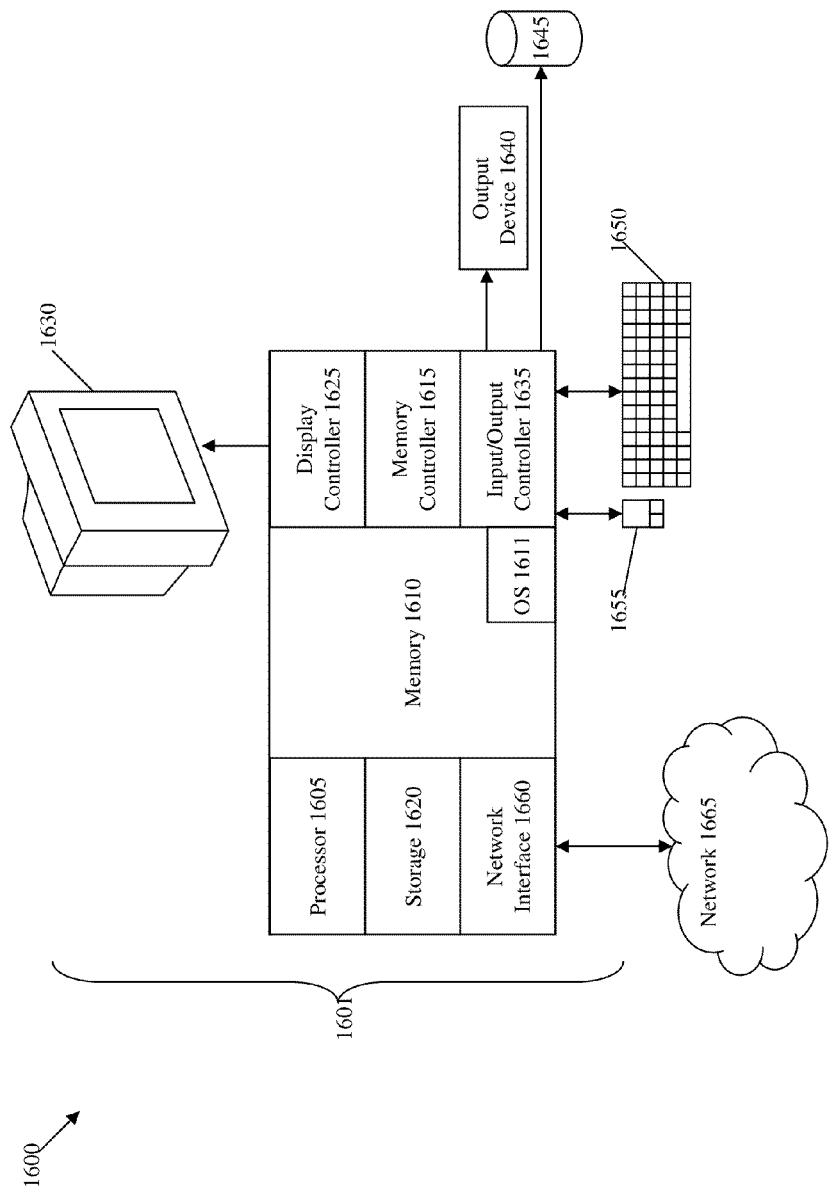
FIG. 16 illustrates an exemplary embodiment of a system for grouping expanded and collapsed rows in a tree structure.

As described herein, the tree structure grouping methods can be implemented in any suitable computing system with a display. FIG. 16 illustrates an exemplary embodiment of a system 1600 for grouping expanded and collapsed rows in a tree structure. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 1600 therefore includes general-purpose computer 1601.

In exemplary embodiments, in terms of hardware architecture, as shown in FIG. 16, the computer 1601 includes a processor 1605, memory 1610 coupled to a memory controller 1615, and one or more input and/or output (I/O) devices 1640, 1645 (or peripherals) that are communicatively coupled via a local input/output controller 1635. The input/output controller 1635 can be, but is not limited to, one or more buses or other wired or wireless connections, as is known in the art. The input/output controller 1635 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1605 is a hardware device for executing software, particularly that stored in memory 1610. The processor 1605 can be any custom made or commercially available processor, a central processing unit (CPU), an auxiliary processor among several processors associated with the computer 1601, a semiconductor based microprocessor (in the form of a microchip or chip set), a macroprocessor, or generally any device for executing software instructions.

The memory 1610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1610 may incorporate electronic, magnetic, optical, and/or other types of storage media. Note that the memory 1610 can have a distributed architecture, where various components are situated remote from one another, but can be accessed by the processor 1605.

The software in memory 1610 may include one or more separate programs, each of which comprises an ordered listing of executable instructions for implementing logical functions. In the example of FIG. 16, the software in the memory 1610 includes the tree structure grouping methods described herein in accordance with exemplary embodiments and a suitable operating system (OS) 1611. The OS 1611 essentially controls the execution of other computer programs, such the tree structure grouping systems and methods as described herein, and provides scheduling, input-output control, file and data management, memory management, and communication control and related services.

The tree structure grouping methods described herein may be in the form of a source program, executable program (object code), script, or any other entity comprising a set of instructions to be performed. When a source program, then the program needs to be translated via a compiler, assembler, interpreter, or the like, which may or may not be included within the memory 1610, so as to operate properly in connection with the OS 1611. Furthermore, the tree structure grouping methods can be written as an object oriented programming language, which has classes of data and methods, or a procedure programming language, which has routines, subroutines, and/or functions.

In exemplary embodiments, a conventional keyboard 1650 and mouse 1655 can be coupled to the input/output controller 1635. Other output devices such as the I/O devices 1640, 1645 may include input devices, for example but not limited to a printer, a scanner, microphone, and the like. Finally, the I/O devices 1640, 1645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 1600 can further include a display controller 1625 coupled to a display 1630. In exemplary embodiments, the system 1600 can further include a network interface 1660 for coupling to a network 1665. The network 1665 can be an IP-based network for communication between the computer 1601 and any external server, client and the like via a broadband connection. The network 1665 transmits and receives data between the computer 1601 and external systems. In exemplary embodiments, network 1665 can be a managed IP network administered by a service provider. The network 1665 may be implemented in a wireless fashion, e.g., using wireless protocols and technologies, such as WiFi, WiMax, etc. The network 1665 can also be a packet-switched network such as a local area network, wide area network, metropolitan area network, Internet network, or other similar type of network environment. The network 1665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1601 is a PC, workstation, intelligent device or the like, the software in the memory 1610 may further include a basic input output system (BIOS) (omitted for simplicity). The BIOS is a set of essential software routines that initialize and test hardware at startup, start the OS 1611, and support the transfer of data among the hardware devices. The BIOS is stored in ROM so that the BIOS can be executed when the computer 1601 is activated.

When the computer 1601 is in operation, the processor 1605 is configured to execute software stored within the memory 1610, to communicate data to and from the memory 1610, and to generally control operations of the computer 1601 pursuant to the software. The tree structure grouping methods described herein and the OS 1611, in whole or in part, but typically the latter, are read by the processor 1605, perhaps buffered within the processor 1605, and then executed.

When the systems and methods described herein are implemented in software, as is shown in FIG. 16, the methods can be stored on any computer readable medium, such as storage 1620, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the tree structure grouping methods are implemented in hardware, the tree structure grouping methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include the prevention of scrolling when wanting to view multiple expanded nodes in a tree structure. Even with a small tree structure, with some at the top of the computing system display and some at the bottom of the computing system display, and all nodes viewable on the computing system display, grouping those scattered nodes on a page for comparison purposes can be beneficial. The system and methods described herein further allow sorting on a different attribute or characteristic of the tree structure rather than just on an attribute of data. In addition, the systems and methods described herein allow grouping collapsed nodes together to aid a user in noticing a node that the user might want to expand. The user can compare more data together without having to use a filter, which could narrow the nodes too much. As such, the systems and methods described herein retain all data in view, and group the data in which the user is actively interested. The user can therefore do more comparing, contrasting, copying and pasting without having to scroll, turn on and off filters and the like. If the user has acted on the wrong data or is comparing the wrong data or has expanded the wrong data, the user can easily pick different data. By grouping nodes, rather than filtering nodes, all nodes are available for the user to work. No nodes that the user may want to later expand or collapse are hidden.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for viewing a tree structure, the method comprising:
    displaying a tree structure comprising a plurality of nodes wherein prior to grouping the nodes are displayed in a sort order, organized into multiple levels of expansion including multiple parent nodes each having one or more subordinate child nodes, wherein each parent node is expandable to display its subordinate child nodes and collapsible to hide its subordinate child nodes;
    displaying first and second of parent nodes in their expanded views to display one or more subordinate child nodes under respective parent nodes, wherein the first and second parent nodes are at a selected level of expansion separated by one or more intervening nodes at the selected level of expansion;
    displaying a control item for grouping expanded nodes in a common viewing space;
    while the expanded nodes are not grouped and displayed in a common viewing space, displaying text in association with the control item explaining that selection of the control item will cause expanded nodes to be grouped and displayed in a common viewing space;

receiving, by the computer, a user selection of the control item; and in response to user selection of the control item, grouping the expanded first and second parent nodes in their expanded views into a common viewing space without displaying the intervening nodes at the selected level of expansion between the first and second parent nodes and without otherwise receiving commands for resorting or filtering the tree structure.

2. The method as claimed in claim 1 wherein the tree structure is a tree table having a top and a bottom.

3. The method as claimed in claim 2 wherein the expanded nodes are grouped at the top of the tree table.

4. The method as claimed in claim 3 wherein the expanded nodes are grouped at the bottom of the tree table.

5. The method of claim 1, further comprising:

while the first and second parent nodes are displayed in the common viewing space, displaying text in association with the control item explaining that a second selection of the control item will cause the grouping of the first and second patent nodes in the common viewing space to be discontinued;

receiving, by the computer, a second user selection of the control item; and in response to the second user selection of the control item, ungrouping the expanded first and second parent nodes and discontinuing the display of the first and second parent nodes in the common viewing space.

6. A computer program product having a non-transitory computer readable medium having instructions to cause a computer to perform a method for viewing a tree structure, the method comprising:

displaying a tree structure comprising a plurality of nodes wherein prior to grouping the nodes are displayed in a sort order, organized into multiple levels of expansion including multiple parent nodes each having one or more subordinate child nodes, wherein each parent node is expandable to display its subordinate child nodes and collapsible to hide its subordinate child nodes;

displaying first and second of parent nodes in their expanded views to display one or more subordinate child nodes under respective parent nodes, wherein the first and second parent nodes are at a selected level of expansion separated by one or more intervening nodes at the selected level of expansion;

displaying a control item for grouping expanded nodes in a common viewing space;

while the expanded nodes are not grouped and displayed in a common viewing space, displaying text in association with the control item explaining that selection of the control item will cause expanded nodes to be grouped and displayed in a common viewing space;

receiving, by the computer, a user selection of the control item; and in response to user selection of the control item, grouping the expanded first and second parent nodes in their expanded views into a common viewing space without displaying the intervening nodes at the selected level of expansion between the first and second parent nodes and without otherwise receiving commands for resorting or filtering the tree structure.

7. The computer program product as claimed in claim 6 wherein the tree structure is a tree table having a top and a bottom.

8. The computer program product as claimed in claim 7 wherein the expanded nodes are grouped at the top of the tree table.

9. The computer program product as claimed in claim 8 wherein the expanded nodes are grouped at the bottom of the tree table.

10. The computer program product of claim 6, further comprising:

while the first and second parent nodes are displayed in the common viewing space, displaying text in association with the control item explaining that a second selection of the control item will cause the grouping of the first and second patent nodes in the common viewing space to be discontinued;

receiving, by the computer, a second user selection of the control item; and in response to the second user selection of the control item, ungrouping the expanded first and second parent nodes and discontinuing the display of the first and second parent nodes in the common viewing space.

11. A computer system, comprising:

a graphical user interface including a display and a selection device, and a computer comprising a processor configured to enable providing and selecting from a menu on the display, wherein the computer is further configured for:

displaying a tree structure comprising a plurality of nodes wherein prior to grouping the nodes are displayed in a sort order, organized into multiple levels of expansion including multiple parent nodes each having one or more subordinate child nodes, wherein each parent node is expandable to display its subordinate child nodes and collapsible to hide its subordinate child nodes;

displaying first and second of parent nodes in their expanded views to display one or more subordinate child nodes under respective parent nodes, wherein the first and second parent nodes are at a selected level of expansion separated by one or more intervening nodes at the selected level of expansion;

displaying a control item for grouping expanded nodes in a common viewing space;

while the expanded nodes are not grouped and displayed in a common viewing space, displaying text in association with the control item explaining that selection of the control item will cause expanded nodes to be grouped and displayed in a common viewing space;

receiving, by the computer, a user selection of the control item; and in response to user selection of the control item, grouping the expanded first and second parent nodes in their expanded views into a common viewing space without displaying the intervening nodes at the selected level of expansion between the first and second parent nodes and without otherwise receiving commands for resorting or filtering the tree structure.

12. The computer system as claimed in claim 11 wherein the tree structure comprises at least one of a grouping of the first node and the second node at a top position on the display, and a grouping of the first node and the second node at a bottom position on the display.

13. The computer system of claim 11, wherein the computer is further configured for:

while the first and second parent nodes are displayed in the common viewing space, displaying text in association with the control item explaining that a second selection of the control item will cause the grouping of the first and second patent nodes in the common viewing space to be discontinued;

receiving, by the computer, a second user selection of the control item; and in response to the second user selection of the control item, ungrouping the expanded first and second parent nodes and discontinuing the display of the first and second parent nodes in the common viewing space.

* * * * *